(No Model.) 6 Sheets—Sheet 1.
L. EHRLICH, G. REIN & E. CATLIN.
FARE REGISTER.
No. 548,434. Patented Oct. 22, 1895.
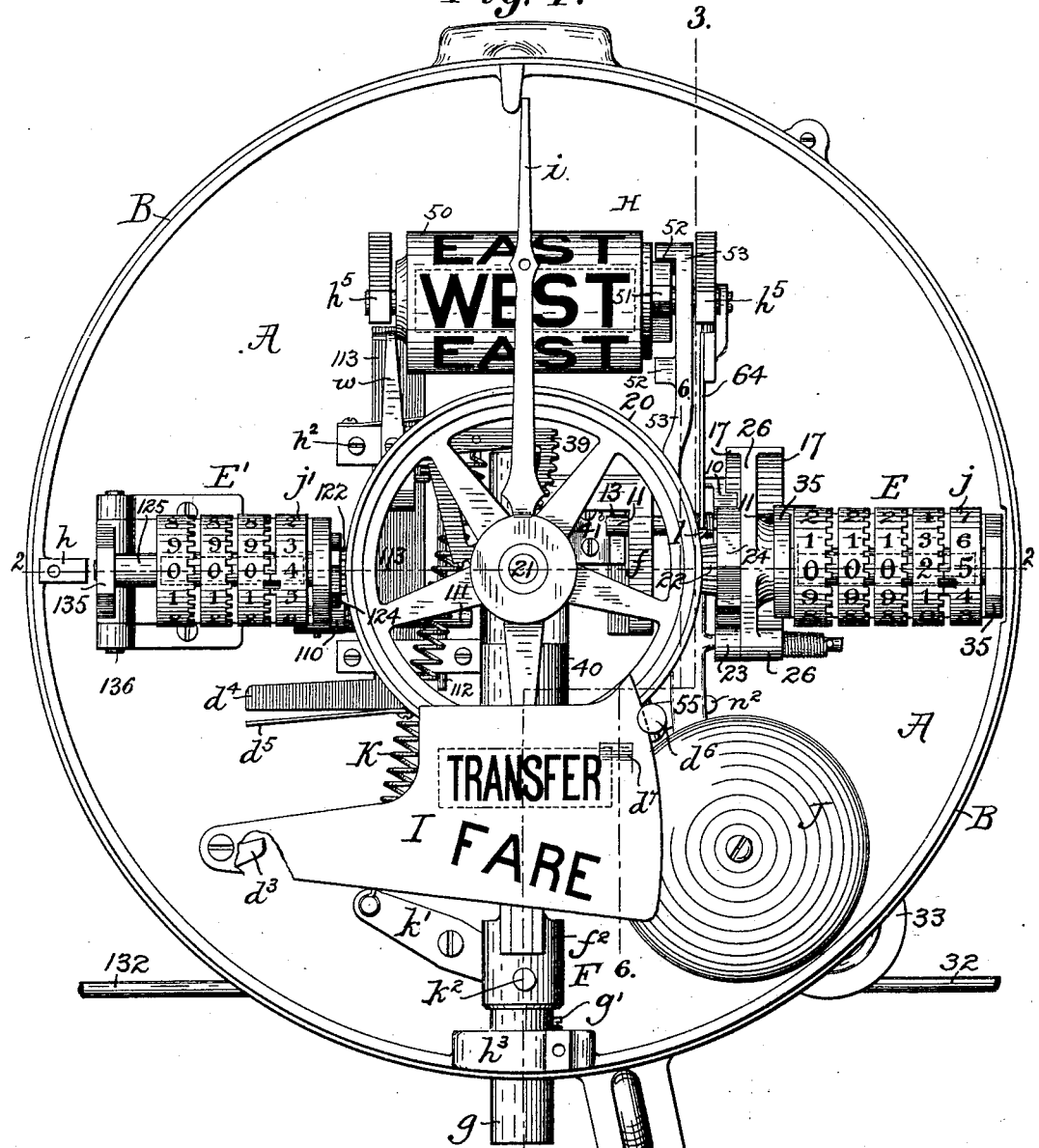
Fig. 1.
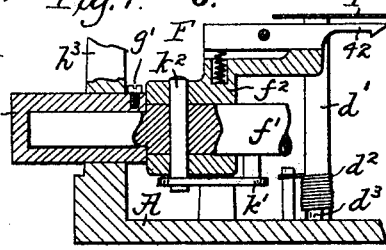
Fig. 1ᵃ.
Witnesses:
W. H. Graham
Geo. C. Bedell
Inventors:
Leo Ehrlich,
Ephron Catlin and
Gustavus Rein,
by Geo. M. Graham, atty (No Model.) 6 Sheets—Sheet 2.
L. EHRLICH, G. REIN & E. CATLIN.
FARE REGISTER.
No. 548,434. Patented Oct. 22, 1895.
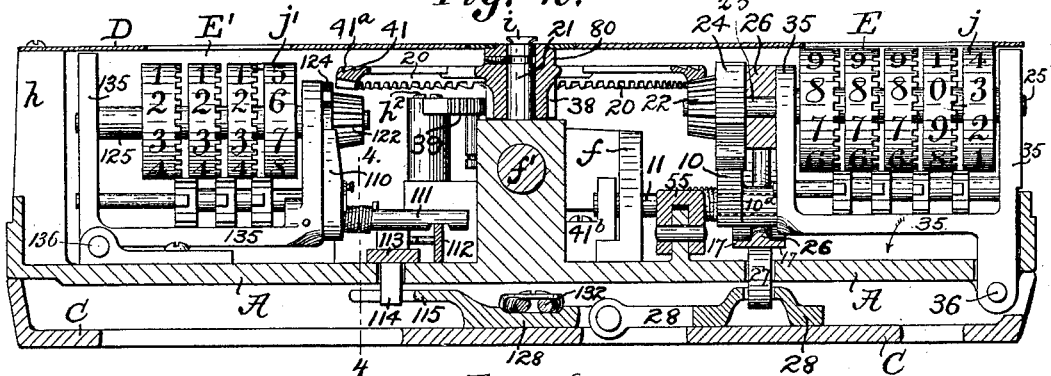
Fig. 2.
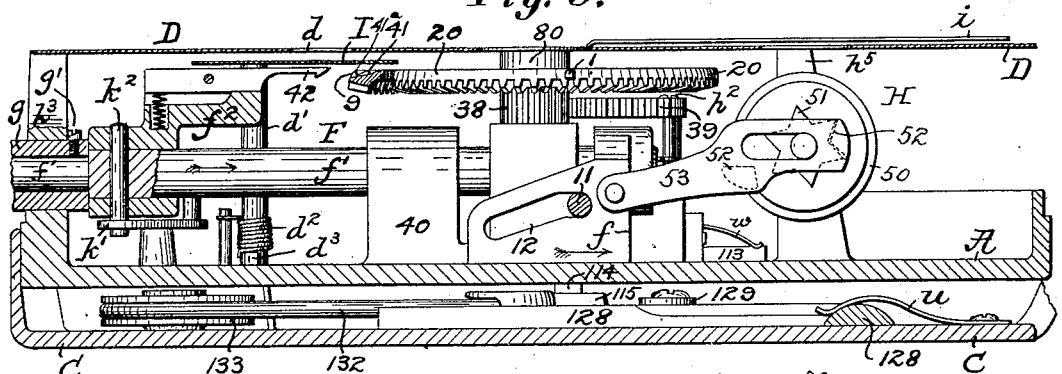
Fig. 3.
Fig. 4.
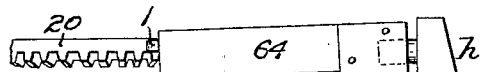
Fig. 5.
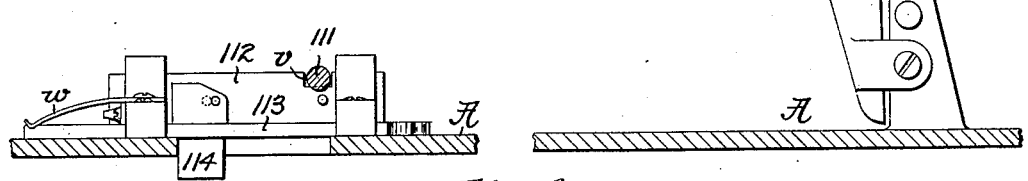
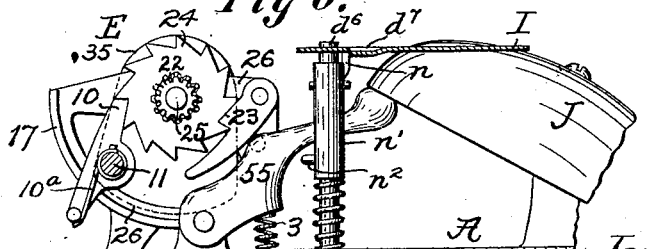
Fig. 6.
Witnesses:
W. H. Graham
Geo. C. Bedell
Inventors:
Leo Ehrlich, Ephron Catlin,
and Gustavus Rein,
by Geo. H. Graham atty.

(No Model.) 6 Sheets—Sheet 4.

L. EHRLICH, G. REIN & E. CATLIN.
FARE REGISTER.

No. 548,434. Patented Oct. 22, 1895.

Witnesses:
W. H. Graham.
Geo. C. Bedell

Inventors:
Leo Ehrlich, Ephron Catlin
and Gustavus Rein,
by Geo. H. Graham, atty.

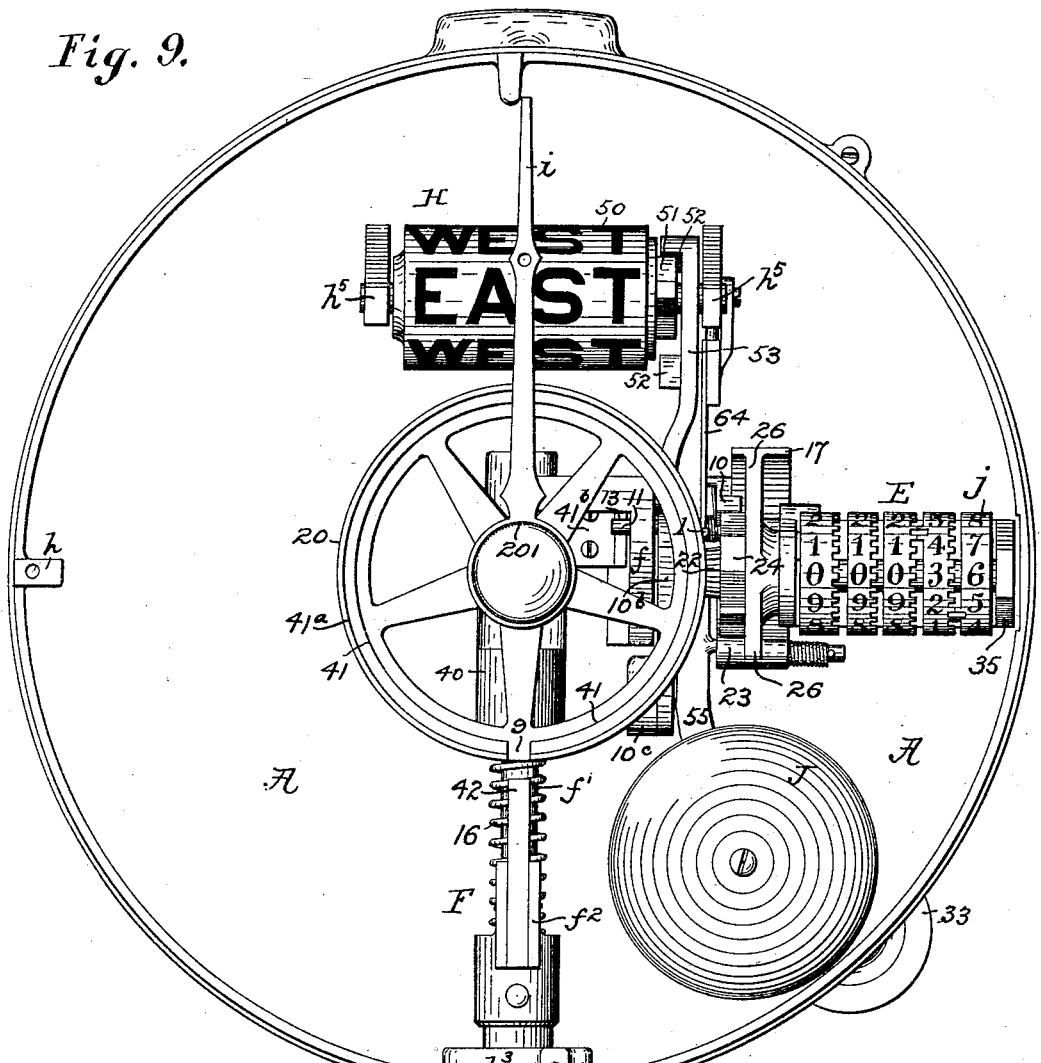
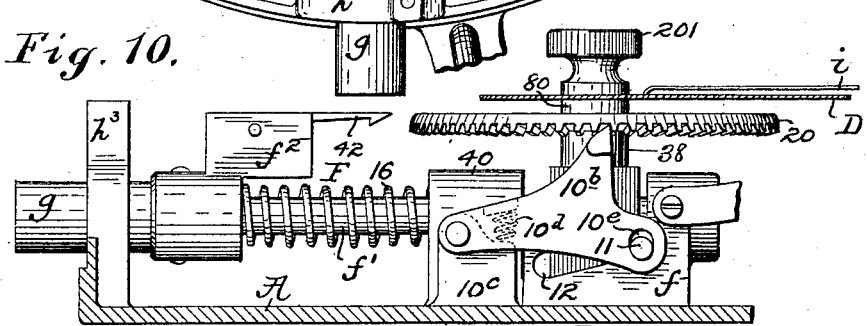

(No Model.) 6 Sheets—Sheet 6.

L. EHRLICH, G. REIN & E. CATLIN.
FARE REGISTER.

No. 548,434. Patented Oct. 22, 1895.

Witnesses:
W. H. Graham
Geo. C. Bedell

Inventors:
Leo Ehrlich, Ephron Catlin and
Gustavus Rein,
by Geo. H. Graham atty

UNITED STATES PATENT OFFICE.

LEO EHRLICH, GUSTAVUS REIN, AND EPHRON CATLIN, OF ST. LOUIS, MISSOURI, ASSIGNORS TO THE ST. LOUIS REGISTER COMPANY, OF SAME PLACE.

FARE-REGISTER.

SPECIFICATION forming part of Letters Patent No. 548,434, dated October 22, 1895.

Application filed October 12, 1892. Serial No. 448,660. (No model.)

*To all whom it may concern:*

Be it known that we, LEO EHRLICH, GUSTAVUS REIN, and EPHRON CATLIN, citizens of the United States, residing in St. Louis, State of Missouri, have invented certain new and useful Improvements in Fare-Registers, of which the following is a specification.

This invention relates to that class of registers and indicators commonly called "street-car" or "fare" registers, wherein is employed a trip-register formed by a step-by-step revoluble index moving over a fixed dial and a permanent register formed by a set of adding-wheels that are moved in unison with the index of the trip-register to preserve the sum of the operations of the register while said index may be returned to zero.

The present invention is more particularly an improvement in certain portions upon that set forth and shown in the Letters Patent to Leo Ehrlich, dated January 24, 1893, No. 490,342, but in addition thereto embraces an automatic resetting device for the trip-register, the combination of two permanent registers with a single trip-register, whereby different classes of fares may be distinguished and accounted for, and also novel constructions and arrangements of parts, as will be fully hereinafter set forth.

As a more ready understanding of the improvements may be had from a detailed description thereof, such description will now be given with reference to the accompanying drawings, in which—

Figure 7:
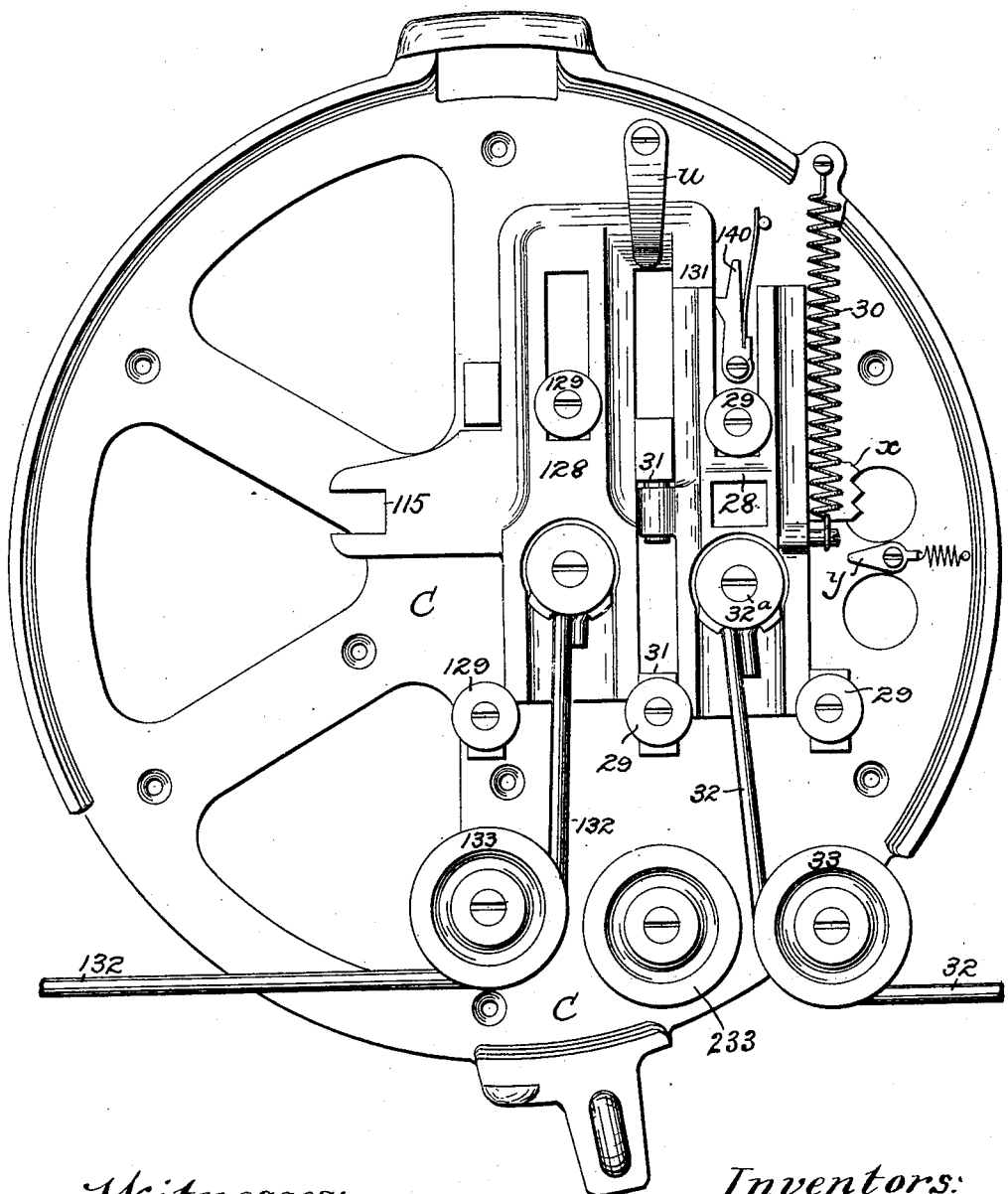
Figure 8:
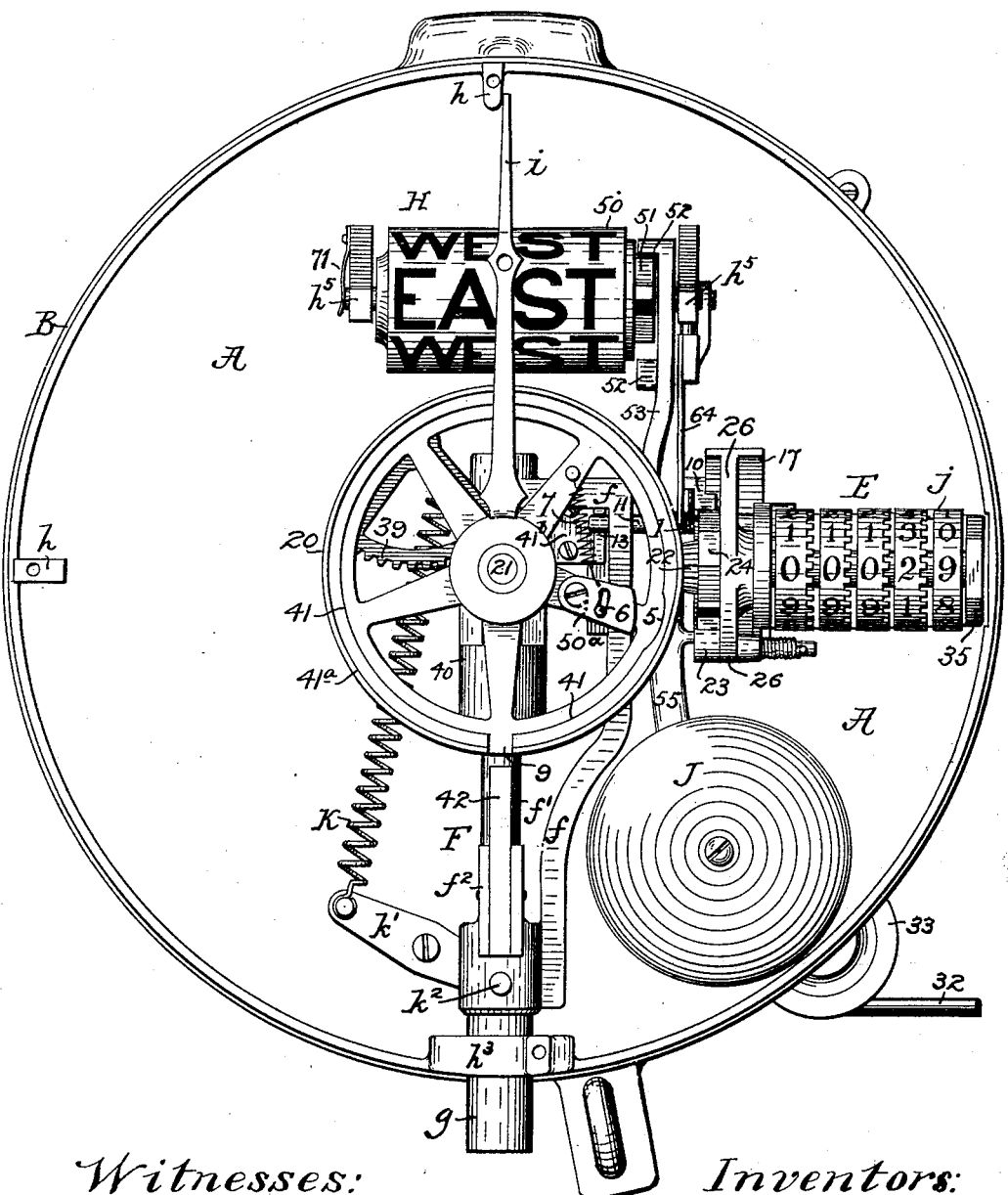
Figure 11:
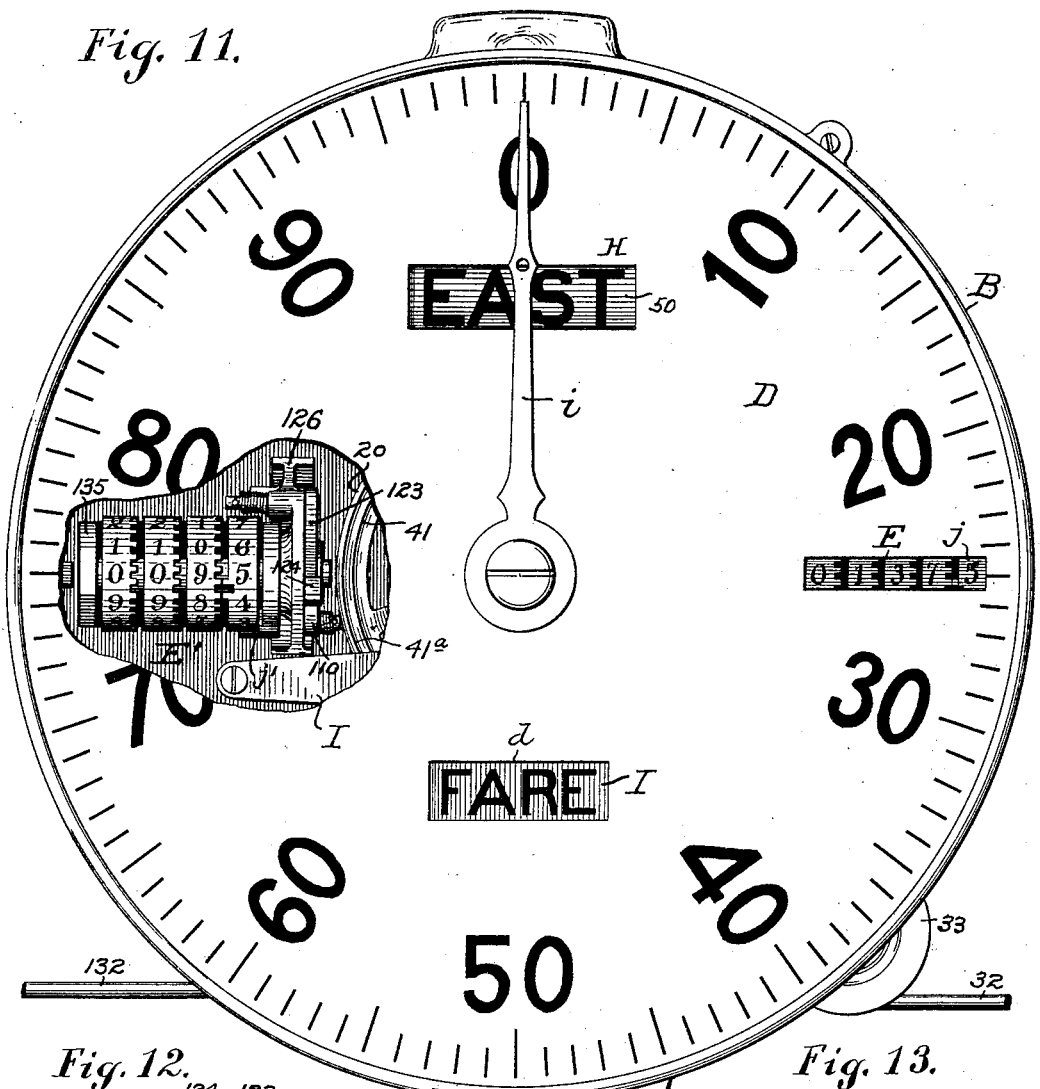
Figure 12:
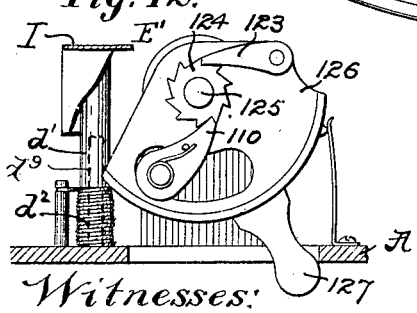
Figure 13:
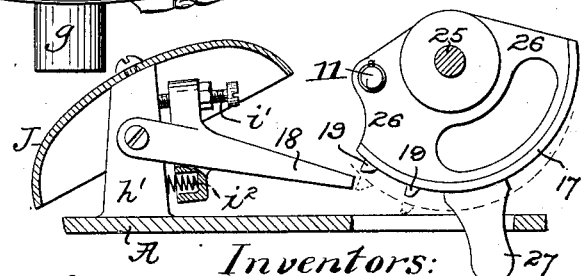

Figure 1 is a front elevation of the register with the glass front and dial of the trip-register removed. Fig. 1ª is a sectional view of the push-piece $g$ and a portion of the rod $f'$. Fig. 2 is a cross-sectional elevation on the line 2 2 of Fig. 1, certain parts being in elevation. Fig. 3 is a vertical sectional elevation on the line 3 3 of Fig. 1. Fig. 4 is a detail sectional elevation, taken on the line 4 4 of Fig. 2, of the carrier and bar for actuating the auxiliary permanent register. Fig. 5 is a detail elevation of the zero-stop and a portion of the bevel-wheel. Fig. 6 is a sectional elevation on the line 6 6 of Fig. 1, showing the pawl and pawl-carrier of the permanent register, the bell and hammer, and the fare-indicating signal. Fig. 7 is an elevation of the false plate removed from the machine, showing the two reciprocating slides for operating the register. Fig. 8 is a front elevation similar to Fig. 1, showing the same construction with the use of only one permanent register, as is common. Fig. 9 is a front view similar to Fig. 8, showing a modified form of the means for returning the index of the trip-register to zero and of the manner of releasing the trip-register, so that it may be returned. Fig. 10 is a sectional elevation of the same, showing particularly the manner of releasing the pawl, so that the trip-register may be returned to zero. Fig. 11 is a front elevation of a register with a portion of its dial removed to disclose the underlying auxiliary permanent register and illustrating a slight modification of that shown in Fig. 1. Fig. 12 is an elevation of the pawl and pawl-carrier for the auxiliary permanent register; and Fig. 13 is a detail elevation particularly of the pawl-carrier of the main permanent register, showing a means for locking it against movement during the returning of the trip-register to zero.

The improved fare-register is supported by a back or base plate A and inclosed by a circular casing B, with a glass front, as usual, the whole being carried by a false back C, that is intended to be secured in place as against the end of a street-car or other vehicle by screws.

The base-plate A, carrying the mechanism of the register, is removably connected to the false back C in any suitable manner, and both the base-plate and false back may be secured together by a bolt and padlock, as in said patent.

The complete register, as shown in Fig. 1 and as modified in Fig. 11, contemplates the use of two permanent registers, as will be hereinafter described; but as many of the novel features are applicable where only one permanent register is used such simpler form of register, as seen in Fig. 8, will first be described, reference being also had to other figures showing the same parts.

The register includes a trip-register and a permanent register. The trip-register consists of the usual dial D, as in Figs. 2, 3, and 11, supported by and secured to posts $h$, (seen in Figs. 5 and 8,) projecting from the back plate A, and an index $i$, arranged above the dial, and the permanent register E consists of the usual series of adding-wheels with their carrying-pinions, as will presently appear. The index $i$ is fixedly secured to the hub 80 of a bevel-gear 20, that is supported to rotate loosely on a central bearing-stud 21, projecting from the back plate. The step-by-step indicating movements of the index are imparted by the oscillations of an actuating device (best seen in Fig. 6) consisting of a pawl 23, that engages with a ratchet 24, fast to a bevel-pinion 22, which meshes with the gear 20. The ratchet 24 and bevel-pinion 22 (see Fig. 2) are both fast to the shaft 25 of the permanent register E, the units-wheel $j$ of which is also fast to said shaft. The pawl 23 is carried by a pawl-carrier 26, (see Figs. 2 and 6,) that is hung loosely on the shaft 25, and said pawl-carrier has a finger 27, that projects rearwardly through an opening in the back plate A and is engaged by a reciprocating slide 28, (see Figs. 2 and 7,) which is supported in bearings 29 on the face of the false back C. The slide 28 is moved between a pair of limiting-stops 31 against the force of a spring 30 by an operating-cord 32, extending within reach of the operator. The cord is secured to a stud $32^a$, projecting from the slide 28, and its end passes outward around or between grooved guide-wheels 33 233, carried by the false back. The slide 28 carries a toothed portion or ratchet $x$, that co-operates with the yielding detent $y$, that is pivoted to the false back C, and serves to compel a complete movement of the slide 28 on each reciprocation.

From the foregoing it will be seen that each time the operating-cord 32 is pulled upon the slide 28 is reciprocated, which in turn oscillates the pawl-carrier 26 in one direction against the force of the spring 30, Fig. 7, so that the pawl 23 in thus moving backward engages with the succeeding tooth of the ratchet 24. Upon releasing the operating-cord 32 the spring 30 causes the slide 28, pawl 23, and pawl-carrier 26 to return to their normal positions, feeding the ratchet 24 forward one step, which in turn through the pinion 22, and gear 20, similarly moves the index over the dial one step.

The permanent register E, as before stated, consists of the usual series of adding-wheels, representing units, tens, hundreds, thousands, &c., all carried by the shaft 25, that is mounted in frame 35, the said adding-wheels having carrying-pinions, as usual. This frame 35 is hinged upon a pin 36 at its outer side to the back plate A, (see Fig. 2,) so that the frame may be rocked and the bevel-pinion 22 moved out of mesh with the bevel-gear 20.

As the ratchet 24 and the units-wheel $j$ of the adding-wheels are fast to the same shaft 25, it results that each time the pawl-carrier 26 is oscillated, as before described, the adding wheel or wheels of the permanent register E is or are moved forward a step simultaneously with the step movement of the index $i$ of the trip-register. The rear side of the pawl-carrier 26 is formed with an oppositely-extending flange 17, (see Figs. 2, 6, and 13,) that overlies the opening in the back plate, through which the finger 27 extends, and prevents access to the interior of the register through said opening. When the frame 35, which, as before stated, also supports the pawl-carrier 26, is rocked to disconnect the bevel-pinion 22 from the gear 20, it is necessary to lock the permanent register against movement to preserve the count. The trip-register, being then out of connection, cannot be moved forward at all, and only backward by the devices hereinafter set forth. For this locking of the permanent register E when the frame 35 is moved to the inoperative position one or more projections 19 (seen in Fig. 13) on the rear surface of the pawl-carrier 26 meet or coincide with a stop or abutment 18, that is formed by a finger connected to the bell-standard $h'$. This stop-finger 18 is mounted so as to yield in one direction for the passage of either or both of the projections 19, but is fixed in the opposite direction. Thus in Fig. 13 the stop-finger 18 is pivotally connected to the standard $h'$ and is held rigid in one direction by an adjustable screw-stop $i'$, that comes against said standard $h'$ and yielding in the other direction against a spring $i^2$.

The setting device or the mechanism by which the trip-register is returned to zero or its starting-point without disturbing the permanent register consists, incidentally, of a disengaging device F for releasing the trip-register or disconnecting the permanent register from the trip-register, and particularly of an automatic motor, such as a contractile spring K, (see Figs. 1 and 8,) for rotating the index of the trip-register rearwardly to its starting-point. Thus with the index or its bevel-wheel 20 (see Figs. 1, 2, 3, and 8) there is combined a pinion 38, integral or fixed so as to rotate with said bevel-wheel 20, and in mesh with said pinion 38 is a toothed segment 39, that is loose upon a post $h^2$, projecting from the back plate A. This segment 39 is connected to one end of the motor-spring K, the opposite end thereof fixed either to the base-plate or to some other part of the register. The parts are so arranged that as the index $i$ is moved step by step forward in the usual registrations of the register the motor-spring K is gradually placed under tension by the rotation or partial rotation of the segment 39. As soon, therefore, as all opposition to backward or return movement of the index $i$ and its connected parts shall be removed, the motor-spring will act to effect this return. With the use of the segment 39 it will be evident that there may come a time during the step-by-step operation of the trip-register—say in nearing or at the completion of a complete rotation—when the segment 39 will become disengaged from the pinion 38. This, however, will make no difference in the effective operation of the motor-spring K, as in such case it continues to hold the last tooth of the segment 39 constantly against the pinion 38, ready as soon as the trip-register is released or unlocked to engage with said pinion and return the trip-register to zero. This construction also results in only enabling the motor-spring K to be placed under a predetermined tension, no matter how many complete rotations of the trip-register may take place before being returned backward to zero. In the present instance the only impediment to this free backward movement of the index $i$ is the fact that the trip-register and the permanent register E, that is normally in gear with the bevel-wheel 20 of the trip-register, are secured against all backward motion by a stop-pawl 10, (see Fig. 6,) that engages with the ratchet 24, which thus holds both the permanent and the trip register against backward movement so long as the permanent register is in active position. The stop-pawl 10 is held to duty by a spring $10^a$. As soon as the permanent register is temporarily disconnected from the trip-register by rocking its frame 35, the motor-spring K will thereupon be free to return the trip-register to zero.

The means for effecting the disengagement or release of the trip-register, whether it be by the actual disconnection of the permanent register E therefrom or broadly the release of a stop-pawl, such as the pawl 10, either acting directly on the trip-register or indirectly, as in this instance, is conveniently embodied in the disengaging device F, before referred to. This device F in its most complete embodiment, as herein illustrated, serves, mainly, a twofold function—viz., to rock the frame 35, carrying the permanent register E, so as to disconnect and connect its bevel-pinion 22 from and to the bevel-wheel 20 and to set the direction-indicator H, and incidentally the device carries means for preventing a fraudulent manipulation thereof.

The device F (see Figs. $1^a$, 2, 3, and 8) is formed partly by a frame $f$, sliding on the back plate A in a guide $41^b$, Fig. 2, and partly by a radially-disposed rod $f'$, that is mounted in bearings provided by the inner portion of the stud 21, and by a bracket 40, extending from the back plate A. The frame $f$ and rod $f'$ are connected rigidly together, and the outer end of the rod $f'$ is provided with a push-piece $g$, that extends to the exterior of the inclosing case C, so as to be conveniently pushed inwardly in operating the slide. The greater portion of the push-piece $g$ consists of a sleeve mounted in an opening in a post $h^3$, projecting from the base-plate A, and loosely surrounding the end of the rod $f'$ and in a measure aiding in supporting said rod. A set-screw $g'$ prevents the entire removal of the push-piece. (See Figs. 1 and $1^a$.) The frame $f$ is provided with an inclined slot 12, Fig. 3, that is engaged by a pin or stud 11 projecting from the inner end of the permanent-register frame 35, said stud also carrying the stop-pawl 10, Fig. 6. In the normal active position of the register with the permanent and trip registers connected the stud 11 occupies the higher part of the inclined slot 12, and as the disengaging device F is pushed inwardly, as indicated by the arrows, Fig. 3, the inclined slot moving over the stud gradually moves it inward or nearer the back plate A, which consequently rocks the frame 35 inward, as indicated by the arrow, Fig. 2, and thus disconnects the bevel-pinion 22 from the wheel 20. On the return of the device F the reverse motion takes place and the pinion 22 and wheel 20 are re-engaged. The inner end of the stud 11 may be guided in its back and forward movements by extending it between the walls of a slot 13, formed in the guide $41^a$. (See Fig. 1.)

In order to prevent the immediate return of the disengaging device F to avoid the necessity of holding it in its inward position, preserving the disconnection of the permanent register from the trip-register until the trip-register has been returned to its zero position, and to compel a complete movement of the disengaging device, there is provided a lock consisting of two engaging parts, one represented by a circular flange 41 on the outer surface of the wheel 20, and a hook-ended latch 42, pivotally connected to a bracket $f^2$, carried by and arranged immediately above the rod $f'$ and spring-pressed in one direction, as in Figs. $1^a$ and 3. The circular flange 41 is cut away or provided with a recess 9, (see Fig. 8,) that lies coincident with the latch 42 when the index $i$ of the trip-register stands at zero, so that should the device F, with said latch, be moved inwardly while the trip-register stands in this position no engaging of the latch 42 with the circular flange 41 will occur, and this recess also permits the release of the latch from the flange, and thus allows the return of the device F to its normal outward position at the completion of the return of the trip-register to its zero position.

As the trip-register represented by the index $i$ has been moved step by step one or more times in the ordinary registering operation, the releasing-recess 9 for the device F has been moved a distance away from coincidence with the latch 42 corresponding to the number of step-by-step movements of the index, and hence a portion of the flange 41 is presented in front of the latch 42 and is engaged thereby. When the device F is pushed inwardly to effect the temporary disconnection of the permanent register or to release the backward-preventing stop represented by the stop-pawl 10, the latch 42 is moved over the wheel 20 and finally engages with the circular flange 41, and thereby temporarily prevents the return of the device F. As soon as this occurs, the permanent register E being then disconnected and the stop-pawl 10 removed from action, the motor-spring K is free to act and immediately rotates the index $i$ and wheel 20 back to the zero position and brings the recess 9 in coincidence with the latch 42, which, no longer being restrained by the circular flange 41 is free to pass through said space and allow the device F to return to its normal outward position, causing the reconnection of the trip and permanent registers.

To prevent only a partial inward movement of the device F with a view to a fraudulent manipulation of the trip-register and to compel a full movement thereof, the bevel-wheel 20 is provided with a second or supplemental circular flange $41^a$, concentric with the flange 41, with which the latch 42 may engage and be prevented from withdrawal should the device F be only partially moved inwardly. As the register is constructed in the present instance, this partial movement of the device F is sufficient to have rocked the permanent-register frame 35 inward, so as to place one of the projections 19 in front of the stop 18, so that even should an attempt be made to operate the register by pulling the cord 32 it will be prevented. The index $i$ and bevel-wheel 20 are stopped at the zero position by a zero-stop 64, (see Figs. 1, 5, and 8,) adapted to meet a projection 1 on said wheel 20. This stop 64 is a yielding one in one direction, so that should the wheel 20 be turned more than a complete revolution in its step-by-step movement the projection 1 may be free to pass said stop.

The return of the device F to its outward normal position may be effected by hand; but as herein embodied it is done automatically in one instance by the motor-spring K (see Figs. 1 and 8) through the means of a lever $k'$, pivoted to the back plate A, one end connected to said spring and the other end attached to the rod $f'$ through a pin $k^2$, as in Fig. 3. Another means, as in Fig. 9, is by an individual spring 16, surrounding the rod $f'$, between the bearing 40 and a shoulder on the rod. The spring K or 16, acting on the device F to return it outwardly, tends to cause the hooked end of the latch 42 to bear with some friction on the flange 41 should the hand be removed from pressing the slide inwardly, so that the latch acts as a brake to the sudden return of the index $i$ to zero under the force of the spring K.

The wheel 20 in the structure shown in Fig. 8 carries a yielding pawl $50^a$, having a slight movement limited by a pin 6, projecting from said wheel 20, that enters a slot in the pawl, and which pawl is held in position by a spring 7. This pawl is situated in advance of the recess 9 of the circular flange 41, and is in position as the index $i$ and wheel 20 return to the zero position under considerable momentum to meet the end of the latch 42 and partially stop such movement of the wheel 20 until the latch may retire slightly, which is allowed by the recess or cut-away portion 5 in the flange 41 directly opposite the curved end of the pawl $50^a$.

Allusion has heretofore been made to the fact that the disengaging device F in effect releases the trip-register from the influence of a stop-pawl 10, that normally prevents its backward movement. In Figs. 9 and 10, and best seen in Fig. 10, there is shown a modification wherein the device F actually operates to release a stop-pawl $10^b$ from engagement with the teeth of the bevel-wheel 20, and thus permits said wheel and the trip-register to be returned to zero either by the motor-spring K, before described, or, as in this particular construction, by the act of the hand through a knob 201, fast to the hub of the bevel-wheel 20. The stop-pawl $10^b$ is pivoted to a bracket $10^c$, projecting from the base A, and is held normally in engagement with the teeth of the wheel 20 by a spring $10^d$. One end of the pawl is slotted at $10^e$ to receive the stud 11, before referred to, that also projects into the inclined slot 12 in the frame $f$ of the device F. When the device F is moved inwardly, as before described, the rocking of the stud 11 rearward also draws the stop-pawl $10^b$ rearward and frees it from the wheel 20, so that said wheel may be rotated back to the zero position.

As thus far described, only one permanent register E, in connection with the trip-register, as in Figs. 8 and 9, has been referred to. In some instances it often happens that two or more classes of fares are collected by the conductor, such as half-fares or transfers, or both, in which case a single permanent register is not capable of distinguishing between the several classes, and hence the returns of a dishonest conductor are liable to be fictitious by including more of the lesser class of fares or transfers than were actually collected by him. In order to avoid this, the register is provided, as in Figs. 1, 2, and 11, with a second or auxiliary permanent register E', arranged in any suitable position, preferably in the hitherto vacant space directly opposed to the permanent register E upon the other side of the wheel 20 of the trip-register. This auxiliary register E' is shown in Figs. 1 and 2 of substantially the same construction and arrangement as the permanent register E, composed of a series of adding-wheels with their respective carrying-wheels mounted in a rocking frame 135, the units-wheel $j'$ being secured to the shaft 125, that carries at its end and secured thereto a bevel-pinion 122, adapted to mesh at the proper time with the bevel-wheel 20. The same shaft also carries, secured thereto, a ratchet 124, that is engaged by a stop-pawl 110, the function of which is simply to prevent any backward movement of the ratchet 124. In this embodiment of the auxiliary register and its coaction with the trip-register the actuated bevel-pinion 122 is normally out of gear with the wheel 20, so that during the ordinary operations of the register the trip-register and the permanent register E will only be operated; but said pinion 122 is adapted at the proper time to be placed in gear with said wheel 20, so as to likewise be moved a step when the trip-register is moved to indicate a fare, and such connection of the auxiliary register E' occurs without disturbing the position of the other permanent register E, and hence both registers will be simultaneously operated. Thus the totals of the permanent register E will show the complete totals of all the operations of the trip-register, while the auxiliary register E' will simply show the total operations of the trip-register for the other or unusual class of fares collected, so that in order to arrive at the number of full fares collected at any one time the total of the auxiliary register E' should be subtracted from that of the register E. In the two modifications of this part of the invention illustrated herein the one already partially described and shown in Figs. 1 to 4 embraces means for rocking the pinion 122 of the auxiliary register into gear with the wheel 20, and thus actuating said auxiliary register through the medium of the trip-register, while in the form shown in Figs. 11 and 12 the auxiliary register is actuated directly without the interposition of the trip-register wheel 20; but in both cases, as will appear hereinafter, the operation of the auxiliary register is effected by an individual actuating-cord or other equivalent means separate from that which alone actuates the trip-register and permanent register E in the ordinary operations of the register. For this purpose the false back C, Fig. 7, in addition to the reciprocating slide 28, before described, is provided with an auxiliary reciprocating slide 128, that is actuated by a second cord 132, passing outward around a guide-wheel 133. This slide 128 is guided by bearings 129 and the bearing 29 and is provided with an extended arm 131, that lies against the upper end of the slide 28. The construction is such that when the slide 28 is reciprocated by a pull upon the cord 32 no motion of the other slide 128 will occur; but when the slide 128 is reciprocated by a pull upon the cord 132 the slide 28 is moved also, the spring 30 and ratchet and detent $x$ $y$ thus serving for both slides, the spring to return them after reciprocation and the ratchet and detent to compel a complete stroke in each direction. The slide 128 is provided with a frictional spring $u$, that holds it against accidental movement while the slide 28 is moved, and to prevent the movement of the slide 128 while the slide 28 is moving or before it has returned to its normal position there is provided a detent 140, (see Fig. 7,) held out of operation while the two slides are contiguous by bearing against their plain surfaces; but when the slide 28 is moved the detent 140 drops below the arm 131 of the slide 128 and prevents any movement thereof. On the return of the slide 28 the detent is raised out of action.

In the structure shown in Figs. 1 to 4 the reciprocating slide 128 is made the means of rocking the pinion 122 into mesh with the bevel-wheel 20. Thus the frame 135, pivoted at 136 in substantially the same manner as the frame 35, is provided with an extended stud 111, overlying and resting upon a cam or sustaining bar 112, that is carried by a reciprocating carrier 113, which has a finger 114 projecting through a slot in the back plate A into the forked end of an arm 115, extending from the slide 128. The carrier 113, with its cam-bar, is reciprocated in bearings on the surface of the back plate, as in Fig. 4, and said bar is provided with a depression $v$ at one point in its length that in the normal idle position of the parts lies immediately in rear of the stud 111 of the frame 135 and allows the pinion 122 of the auxiliary register to stand out of gear with the wheel 20. As soon as the slide 128 is reciprocated, imparting a like movement to the carrier 113 and bar 112, the depression $v$ is removed from in rear of the stud 111 and the high part of the bar 112 forces the frame 135 outward, so as to cause the pinion 122 and wheel 20 to mesh. This meshing of said pinion and wheel occurs at the commencement of the movement of the slide 128, and the bar holds them in mesh during the remainder of the movement of said slide and until just before it returns to rest in its normal position, when the carrier 113 and bar 112 are brought back to their idle position and the frame 135 allowed to rock back to its rear position, carrying the pinion 122 out of mesh with the wheel 20. To hold the carrier 113 and bar 112 against accidental movement, a spring $w$ (see Fig. 4) is arranged to bear upon the end of the carrier.

So that the passenger and conductor may know that the auxiliary permanent register E' has been duly operated, there is provided an indicating-signal I, Figs. 1, 3, and 6, and arranged just beneath the dial D in position to expose its indication through an opening $d$, Fig. 11, in the said dial.

The indicating-signal I consists of a plate connected to one end of a post $d'$, Fig. 12, that is mounted to rock a pin $d^9$, projecting from the base-plate A. The post supports a coil-spring $d^2$, which tends to hold the signal-plate in one position—say with the words "Five-cent fare" or "Ten-cent fare" exposed through the opening $d$ in the dial D—and it is also provided with a toe $d^3$ (see Fig. 1) in position to be struck by the arm $d^4$ of the carrier 113. To lessen the blow of the arm $d^4$ on the toe $d^3$, the operative face of the arm is covered by a yielding flat spring $d^5$. The free end of the indicating-signal plate is guided and steadied by the slotted end of a post $d^6$, (see Figs. 1 and 6,) that embraces the edge of said plate.

During the usual operation of the register, when the permanent register E, with the trip-register, is alone operated, the indicating-signal I stands with its indication "Fare" exposed; but when the auxiliary register E' is operated and the carrier 113 reciprocated, as before explained, its arm $d^4$ strikes the toe $d^3$ and rocks the signal I, so that the indication "Transfer" or other indicating-mark is exposed. It is obvious that the signal may only remain in this position during the reciprocation of said carrier 113; but, as herein embodied, the signal I has an ear $d^7$ punched inward from its surface in position when the signal is in its changed position, as in Figs. 1 and 6, to meet a pin $n$, projecting from a rearwardly-yielding sleeve $n'$ on the post $d^6$. As the signal I is moved by the arm $d^4$ to its changed position, the ear $d^7$ rides idly over the pin $n$, which, with the sleeve, yields to permit the ear to pass and when past moves up to catch the ear and hold the signal. The pin $n$ is tripped to release the signal I, so that it may return to its normal position under the force of its coil-spring $d^2$ by the action of the bell-hammer 55, which when rocked, as will presently appear, to strike the bell J bears against a projection $n^2$ on the sleeve $n'$ and depresses it sufficiently to remove its pin $n$ from the ear $d^7$.

The bell J is sounded at each operation of the register by the movement of the actuating-pawl 23, (see Fig. 6,) whose outer surface rides over a portion of the bell-hammer 55 to depress it against its spring 3, and as soon as the end of the pawl ceases to bear the hammer rearward the latter is suddenly released and strikes the bell. In the modification of the auxiliary permanent register E' shown in Figs. 11 and 12, or, more strictly, in the means for moving said register, the shaft 125 lacks the pinion for immediate engagement with the bevel-wheel 20, and in its place is provided with a pawl-carrier 126, provided with an actuating-pawl 123, that engages with the ratchet 124, and each time said pawl-carrier is oscillated moves the adding-wheels of the register E' one step, as will be readily understood. This movement of the pawl-carrier 126 is had through the reciprocation of the slide 128, Fig. 7, as in the other structure before described, the finger 127, Fig. 12, of said pawl-carrier projecting through the back plate A and engaged by the forked end of the arm 115, Fig. 7, of said slide 128. Although there is no direct connection between the trip-register and this auxiliary register E', the trip-register is operated just as before, because of the simultaneous reciprocation of the slide 28, as is also the permanent register E.

The improved register is also provided with a direction-indicator H, which consists of a revoluble roll 50, bearing indications such as "East," "West," or the like, said indications being duplicated one or more times around the roll. The roll 50, Figs. 1, 3, 8, and 9, is mounted to rotate in bearings in a pair of posts $h^5$ against the friction of a flat spring 71 and carries on one side a star-wheel 51, that is engaged by two detents 52 of an anchor-lever carried by an arm 53, projecting from the disengaging device F. When the device F is reciprocated in one direction, one detent 52, engaging with the star-wheel 51, rotates the latter and the roll 50 one-half of a complete forward step, moving the direction-plate showing "East" through the opening of the dial D, Fig. 11, behind the dial and bringing a blank space on the roll to coincide with said opening. On the rearward or return reciprocation of the device F the other detent 52 moves into engagement with the star-wheel and moves it and the roll another one-half step and completes the step movement, bringing the direction-plate bearing "West" to view through the opening in the dial.

What is claimed is—

1. The combination with the trip register, the permanent register and means for actuating said registers step by step, of a disengaging device for releasing the trip register so that it may move backward to zero, a motor spring for automatically returning the trip register to zero after having power stored up in it by the step by step actuation, and toothed gearing connecting said spring with the trip register, substantially as described.

2. The combination of the trip-register, a pinion movable in unison therewith, a segment in gear with the pinion, a motor spring connected to the segment, means for actuating the registers step by step and placing the spring under tension, and means for releasing the trip-register, so that the motor spring may act, substantially as described.

3. The combination with the trip-register and the permanent register, and means for moving the registers step by step, of a disengaging device for releasing one register from the other, and a single spring for returning the trip register to zero and for returning the disengaging device to its inactive position, substantially as described.

4. The combination of an index and its carrying wheel, the permanent register geared with said wheel, a disengaging device for disconnecting said register from said wheel, a spring constantly tending to hold said device in its inactive position, a circular flange on the wheel, a non-rotating engaging latch carried by the device, and a motor for returning said wheel to zero, substantially as described.

5. The combination of a step by step rotatable index and its carrying wheel, a stop-pawl engaging with and normally preventing backward rotation of said wheel, a disengaging device for releasing said stop-pawl, a spring constantly tending to hold said device in its inactive position, a flange on the carrying wheel, and a non-rotating engaging latch on the device for holding the stop-pawl in its released position against the tension of said spring, and means for turning the index and carrying wheel backward, substantially as described.

6. In a fare register the combination of the wheel 20 having a circular flange with a recess, a slide having a non-rotating latch for engaging said flange, automatic means for rotating said wheel until the recess in the flange coincides with the latch and a spring free to move the latch from the recess, substantially as described.

7. The combination with the wheel 20, having the broken circular flange, of a latch for engaging the flange, and a brake pawl carried by said wheel and adapted to meet the latch, substantially as described.

8. The combination with a pawl-carrier 26, having two projections, of an engaging stop as 18, and means for moving the pawl-carrier to place the projections in line with the stop, substantially as described.

9. The combination with a pawl-carrier 26, having two projections, of an engaging stop 18, fixed in one direction and yielding in the other, and means for moving the pawl-carrier to place the projections in line with the stop, substantially as described.

10. The combination with the normally exposed trip-register and the permanent register, of an auxiliary permanent register, means for actuating the said first two registers continuously step by step, another means for actuating all three registers, step by step, and means for returning the trip register to zero without disturbing the condition of the permanent registers, substantially as described.

11. The combination with the trip-register, the permanent register and gearing connecting the two registers, of an auxiliary permanent register having a gear adapted to be geared with and ungeared from said two registers, substantially as described.

12. The combination with the trip-register and permanent register, of an auxiliary permanent register, an actuating slide for said first two registers, another actuating slide for said auxiliary register, and adapted to operate the first named slide, whereby the three registers are operated, and means for returning the trip register to zero without disturbing the condition of the permanent registers, substantially as described.

13. The combination with the registers, of two actuating slides therefor, a projection on one slide to bear against the other, and a single spring and connections with the slides for returning one slide or both slides when moved, substantially as described.

14. The combination with the registers, of two actuating slides therefor, and a locking pawl for preventing the operation of one slide while the other is being moved and permitting both slides to be moved simultaneously, substantially as described.

15. The combination with the registers and the fare indicating signal I, of an arm for moving it in one position, a yielding pin for holding it in such position, and means connected with one of the registers for moving the pin to release the signal, substantially as described.

16. The combination with the registers and the fare indicating signal I, of an arm for moving it in one direction, a longitudinally yielding pin for holding it in such position, and an oscillating pawl for depressing the pin to release the signal, substantially as described.

In testimony whereof we have hereunto set our hands in the presence of two witnesses.

LEO EHRLICH.
GUSTAVUS REIN.
EPHRON CATLIN.

Witnesses as to Ehrlich and Rein:
W. PALMER CLARKSON,
J. C. BOWMAN.

Witnesses as to Catlin:
E. LACKLAND,
E. M. LACKLAND.